(No Model.)
2 Sheets—Sheet 1.
J. G. DILLAHAY.
DITCHING MACHINE.
No. 603,557.
Patented May 3, 1898.
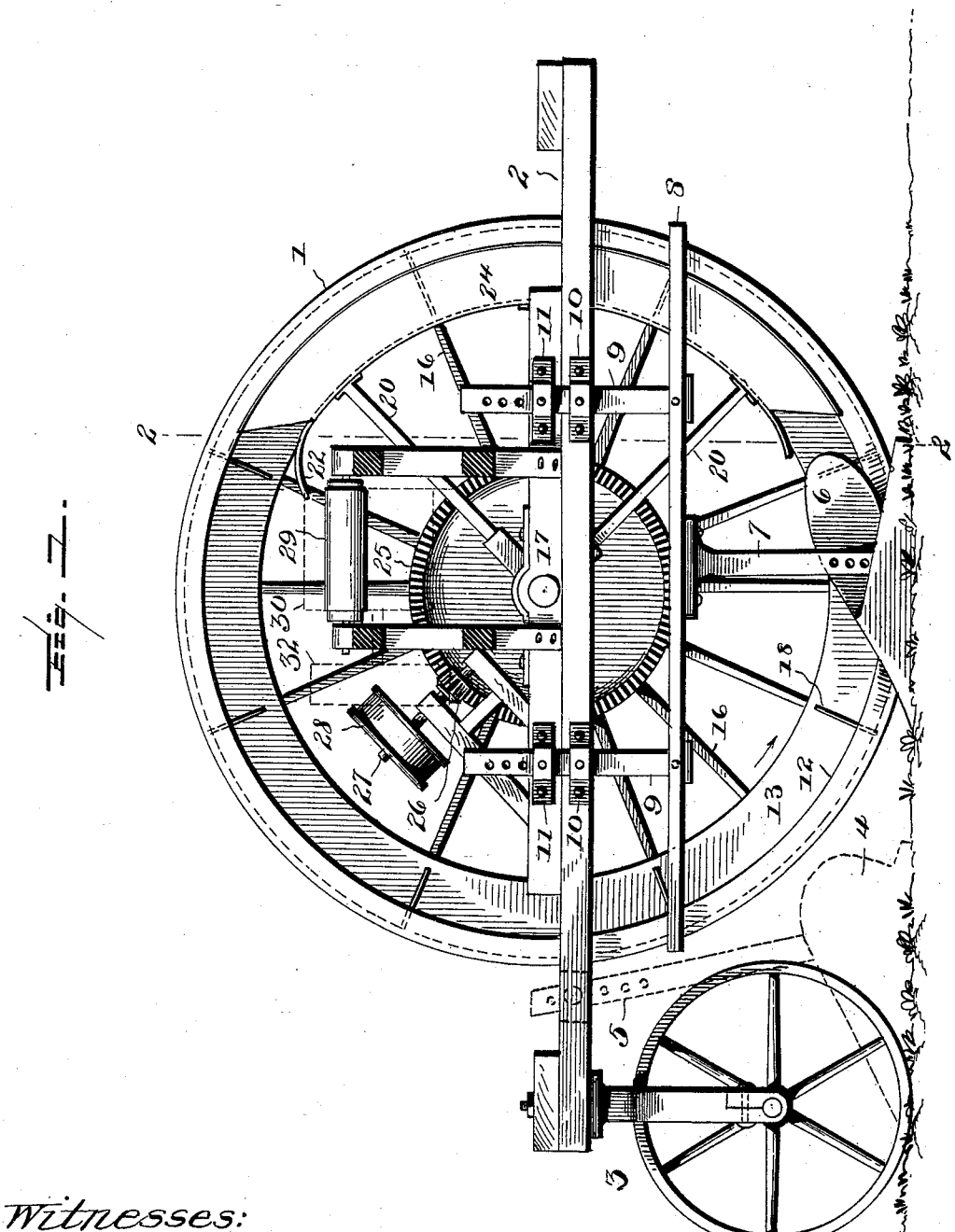
Witnesses:
L. C. Hills.
W. A. Roberts.
Inventor:
J. G. Dillahay.
By Glascock & Co.
Att'ys

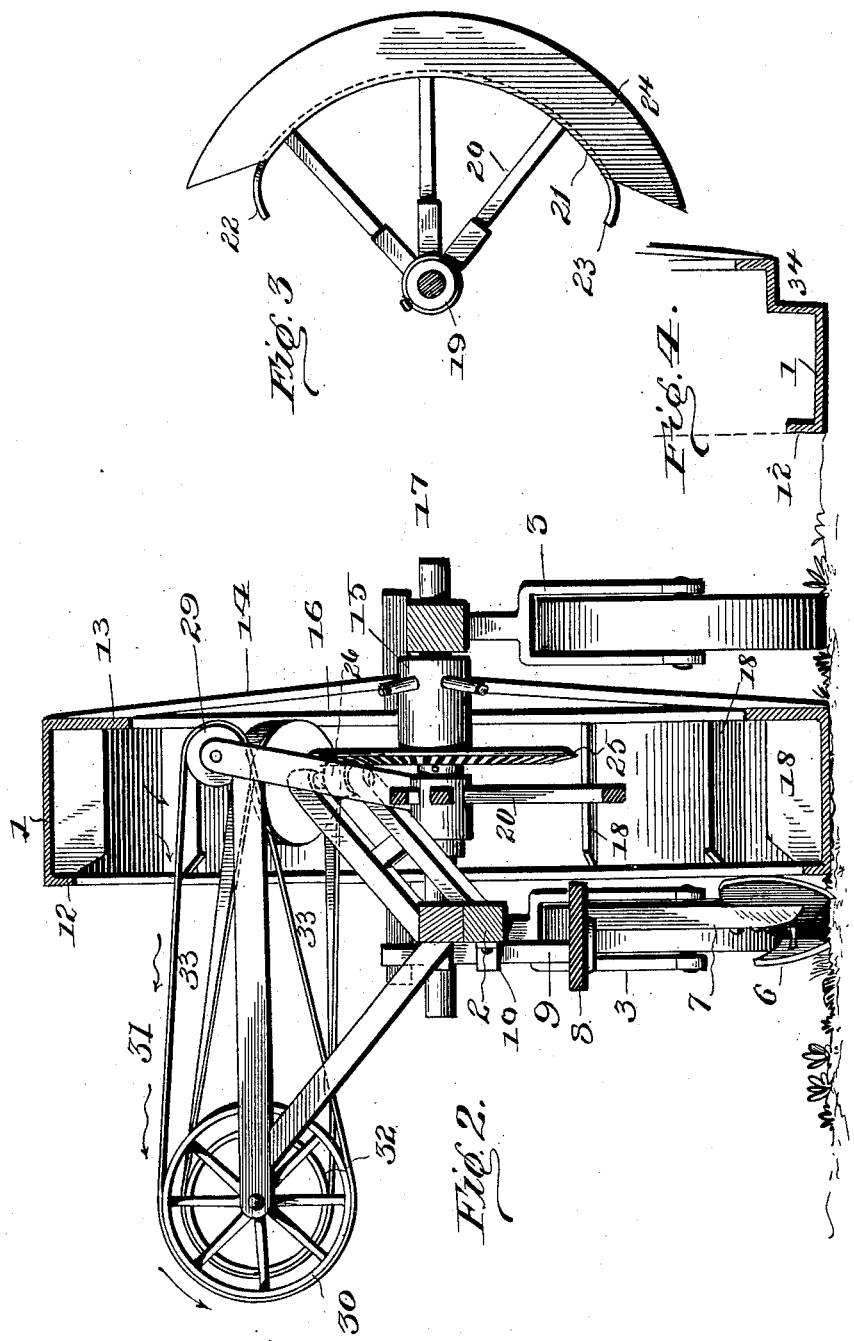

UNITED STATES PATENT OFFICE.

JOHN G. DILLAHAY, OF AUSTIN, TEXAS, ASSIGNOR OF ONE-HALF TO CHARLES G. LAND AND GEORGE W. THOMPSON, OF SAME PLACE.

DITCHING-MACHINE.

SPECIFICATION forming part of Letters Patent No. 603,557, dated May 3, 1898.

Application filed June 16, 1897. Serial No. 641,034. (No model.)

*To all whom it may concern:*

Be it known that I, JOHN G. DILLAHAY, a citizen of the United States, residing at Austin, in the county of Travis and State of Texas, have invented a certain new, useful, and valuable Improvement in Ditching-Machines, of which the following is a full, clear, and exact description.

My invention has relation to ditching-machines or machines adapted to cut ditches and elevate the earth therefrom and throw it to one side.

My machine can be used to advantage in building roads and in grading, and it can also be used to advantage in cutting ditches.

The object of the machine is to cut the earth and throw it into a series of buckets or elevators attached to the inner side of a rim of a wheel, said buckets or elevators adapted to carry the earth up and deposit the same on an endless belt, said belt extending and moving laterally from the wheel and adapted to carry the dirt to one side and throw it from the machine.

The further object of the invention is to provide a wheel of such construction as will permit the reception of a volume of earth from plows of different sizes, said wheel adapted to elevate the earth, as above stated.

The further object of the invention is to provide a plow in front of the wheel, said plow adapted to open a furrow in which the wheel is to run, and said plow throws any obstruction which might interfere with the operation of the wheel to one side.

In the accompanying drawings, Figure 1 is a side elevation, partly in section, of the machine. Fig. 2 is a transverse sectional view of the machine cut on the line 2 2 of Fig. 1. Fig. 3 is a side elevation of a guide adapted to hold the dirt in the wheel. Fig. 4 is a sectional view of a lower portion of the wheel, showing a modified form.

The wheel 1 is suitably journaled in the frame 2. Said frame is provided at its forward end with a pair of colter-wheels 3, one wheel located on each side of the path of the wheel 1, as shown in Fig. 2. The left-hand plow 4 is attached by the standard 5 to the frame 2, said plow 4 being in the path of the wheel 1 and adapted to open a suitable furrow for the said wheel 1 to travel in. The standard 5 is provided at its junction with the frame 2, with suitable means for perpendicularly adjusting the depth of the furrow made by the plow 4. The right-hand plow 6 is located at the side of the wheel 1 and at about the point where the periphery of the wheel 1 comes in contact with the ground. The standard 7 connects the plow 6 with the horizontal beam 8, said beam in turn being connected by means of the perpendicular bars 9 9 with the frame 2 of the machine. Said bars pass under the keepers 10 10 and 11 11, said keepers being secured to the frame 2, and the uprights 9 9 may be perpendicularly adjusted under said keepers and retained at any desired position by means of bolts which pass through suitable perforations in the said keepers and through perforations in the uprights 9 9. Thus the perpendicular position of the plow 6 may be varied and the depth of the furrow made by said plow regulated. As the depth of the furrow of the plow 6 is regulated the volume of dirt turned up by said plow is correspondingly regulated.

The rim of the wheel 1 is provided on the side next to the plow 6 with a short perpendicular flange 12, and the opposite side of the rim of the wheel 1 is provided with the long perpendicular flange 13. The spokes 14 14 connect the side of the wheel provided with the flange 13 with the hub 15. The spokes 14 are inclined, as shown in Fig. 2, and the perpendicular spokes 16 also connect the rim of the wheel with the hub 15. The spokes 16 and 14, being at an angle to each other, brace the wheel and add much to its strength. The hub 15 is loosely journaled on the axle 17. The inner side of the rim of the wheel 1 is provided with a number of cross-strips 18 18, said strips extending from the flange 13 to the flange 12 and forming pockets or elevators for the earth.

The collar 19 is loosely journaled on the axle 17. The spokes 20 connect the plate 21 with the collar 19. Said plate 21 describes the arc of a circle, and the ends of said plate are bent toward the center of the wheel, as at 22 and 23. The plate 21 is provided on one side with the rectangular flange 24, said flange describing the arc of a circle and adapted to come in contact with the edge of the flange 12. The plate 21 is adapted to come in close proximity to the inner horizontal edges of the elevators 18, as indicated in Fig. 1.

The beveled gear-wheel 25 is fixed to the hub 15, and the beveled gear-wheel 26 is suitably journaled to an extension of the frame 2, as shown in Fig. 1, the gear-wheel 26 meshing with the gear-wheel 25. The gear-wheel 26 is fixed to the shaft 27, and the pulley 28 is also fixed to said shaft 27. Thus as the gear-wheel 26 is revolved the pulley 28 is also revolved.

The pulley 29 is journaled horizontally to an extension of the frame 2, and the pulley 30 is horizontally journaled to an extension of the frame 2, said pulley 30 being at a suitable distance to one side of the wheel 1. The belt 31 passes around the pulleys 29 and 30. The pulley 29 is located within the wheel 1 and under the upper portion thereof. The belt-pulley 32 is connected to the said pulley 30, and the belt 33 passes around the pulleys 28 and the pulley 32.

In operation the machine works as follows: The horses or other means for moving the machine are attached to the forward end in front of the colter-wheels 33. As the machine passes over the ground the plow 4 opens a furrow, and the wheel 1 follows along in said furrow. The plow 6 opens a furrow at the side of the wheel 1, and said plow throws the dirt over the flange 12 upon the inner side of the rim of the wheel 1. The wheel 1 as it revolves elevates the dirt, and the elevators 18 carry the dirt under the plate 21, the upturned end 23 of the said plate packing the dirt down in close to the inner side of the rim, the flange 13 retaining the dirt at one side of the rim of the wheel 1, the flange 24, together with the flange 12, retaining the dirt at the opposite side. The dirt is carried up and thrown over the bent end 22 and deposited upon the upper side of the belt 31. The belt 31 carries the dirt to the side of the machine and casts it off, as indicated by the arrows in Fig. 2. As the wheel 1 revolves a rotary motion is transmitted through the gear-wheel 25 and gear-wheel 26, through the shaft 27 to the pulley 28, and by means of the belt 33 to the pulley 32, said pulley 32 being attached to said pulley 30. Thus the belt 31 is caused to travel about the pulleys 29 and 30. In the form of the wheel, as shown in Fig. 4, the capacity of the wheel 1 is not so great as that shown in Fig. 2. Thus a smaller plow 6 may be employed; also, a smaller plow 4 may be employed, as it is not necessary to open such a wide furrow as would be necessary for the form of the wheel, as shown in Fig. 2. The angular partition 34 being inserted in the rim of the wheel reduces the capacity of the rim and also the lateral dimensions of the rim.

Having thus described my invention, what I claim as new, and desire to secure by Letters Patent of the United States, is—

1. In a machine such as described, a wheel adapted to elevate earth, a beveled gear attached to said wheel, a beveled gear attached to a shaft journaled in the framework of the machine, said beveled gears meshing with each other, a pulley attached to the shaft of the last said beveled gear, a pulley located within the wheel, a pulley located to one side of the wheel, a conveying-belt surrounding the last said pulleys, a pulley attached to the last said outer pulley, and a belt surrounding the pulley attached to the conveying-belt pulley and the pulley attached to the shaft of the last said beveled cog-wheel.

2. In a machine such as described, a wheel adapted to elevate earth, said wheel having on the inner side of its rim suitable elevators, a short flange located at one edge of the wheel-rim, a longer flange located at the opposite edge of the wheel-rim, a guide adapted to co-act with the wheel-rim in elevating the earth, said guide having at one edge a flange terminating in the vicinity of the edge of the shorter flange of the wheel-rim, said guide having at its upper and lower ends inwardly-bent sections adapted to press and deliver the earth.

In testimony whereof I affix my signature in presence of two witnesses.

JOHN G. DILLAHAY.

Witnesses:
HENRY E. SHELLEY,
FRED. W. SHELLEY.